(12) United States Patent
Akazawa et al.

(10) Patent No.: US 8,902,564 B2
(45) Date of Patent: *Dec. 2, 2014

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Teppei Akazawa, Nagaokakyo (JP); Kenjiro Hadano, Nagaokakyo (JP); Masahiro Sakuratani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,030

(22) Filed: Jan. 29, 2014

(65) Prior Publication Data

US 2014/0146438 A1   May 29, 2014

Related U.S. Application Data

(63) Continuation of application No. 13/357,677, filed on Jan. 25, 2012, now Pat. No. 8,675,341.

(30) Foreign Application Priority Data

Jan. 26, 2011   (JP) ................. 2011-014140

(51) Int. Cl.
| | |
|---|---|
| *H01G 4/30* | (2006.01) |
| *H01G 4/06* | (2006.01) |
| *H01G 4/005* | (2006.01) |
| *H01G 4/012* | (2006.01) |
| *H01G 4/232* | (2006.01) |

(52) U.S. Cl.
CPC ............... *H01G 4/005* (2013.01); *H01G 4/012* (2013.01); *H01G 4/232* (2013.01); *H01G 4/30* (2013.01)

USPC ...................... 361/303; 361/301.4; 361/321.1; 361/321.2; 361/311

(58) Field of Classification Search
CPC ....... H01G 4/228; H01G 4/005; H01G 4/012; H01G 4/30; H01G 4/232; H01G 4/12
USPC ............................ 361/321.1, 321.2, 303, 311
See application file for complete search history.

(56) References Cited

U.S. PATENT DOCUMENTS

| 8,675,341 B2 * | 3/2014 | Akazawa et al. ......... 361/321.1 |
| 2009/0310277 A1 | 12/2009 | Kayatani et al. |
| 2010/0002356 A1 | 1/2010 | Yoshida et al. |

FOREIGN PATENT DOCUMENTS

| JP | 10-154632 A | 6/1998 |
| JP | 2008-294298 A | 12/2008 |
| JP | 4518885 B2 | 8/2010 |

OTHER PUBLICATIONS

Taniguchi et al., "Multilayer Ceramic Electronic Component and Manufacturing Method Thereof", U.S. Appl. No. 12/485,360, filed Jun. 16, 2009.

(Continued)

*Primary Examiner* — Eric Thomas
*Assistant Examiner* — Arun Ramaswamy
(74) *Attorney, Agent, or Firm* — Keating & Bennett, LLP

(57) ABSTRACT

In a multilayer ceramic electronic component, when a region of a ceramic body in layers where neither of a first internal electrode and a second internal electrode is provided as viewed in a direction in which a plurality of ceramic layers are stacked on one another is defined as a non-effective layer region, a dummy lead-through conductor is arranged in the non-effective layer region so as to lead to at least two locations on portions of superficies of the ceramic body and be electrically connected to a second external electrode. When a conductive medium is brought into contact with one of a plurality of exposed edges of the dummy lead-through conductor, a current is also applied to the other exposed edges.

8 Claims, 16 Drawing Sheets

(56) References Cited

OTHER PUBLICATIONS

Yoshida et al., "Monolithic Ceramic Electronic Component", U.S. Appl. No. 12/494,537, filed Jun. 30, 2009.
Iwanaga et al., "Laminated Ceramic Electronic Component and Manufacturing Method Therefor", U.S. Appl. No. 13/189,636, filed Jul. 25, 2011.
Sasaki, "Electronic Component", U.S. Appl. No. 13/187,678, filed Jul. 21, 2011.
Akazawa et al., "Multilayer Ceramic Electronic Component", U.S. Appl. No. 13/357,677, filed Jan. 25, 2012.
Taniguchi et al., "Multilayer Ceramic Electronic Component and Manufacturing Method Thereof", U.S. Appl. No. 13/484,300, filed May 31, 2012.
Akazawa et al., "Laminated Ceramic Electronic Component", U.S. Appl. No. 13/494,042, filed Jun. 12, 2012.
Sakuratani, "Monolithic Ceramic Electronic Component", U.S. Appl. No. 13/517,624, filed Jun. 14, 2012.
Sakuratani et al., "Monolithic Ceramic Electronic Component", U.S. Appl. No. 13/517,625, filed Jun. 14, 2012.
Sakuratani et al., "Monolithic Ceramic Electronic Component", U.S. Appl. No. 13/561,285, filed Jul. 30, 2012.
Kuroda et al., "Ceramic Electronic Component and Ceramic Electronic Apparatus", U.S. Appl. No. 13/923,438, filed Jun. 21, 2013.
Kuroda et al., "Ceramic Electronic Component and Ceramic Electronic Apparatus", U.S. Appl. No. 13/925,946, filed Jun. 25, 2013.
Sakuratani et al., "Monolithic Ceramic Electronic Component", U.S. Appl. No. 14/143,107, filed Dec. 30, 2013.

\* cited by examiner

MULTILAYER CERAMIC ELECTRONIC COMPONENT

BACKGROUND OF THE INVENTION

1. Field of the Invention

The present invention relates to a multilayer ceramic electronic component. In particular, the present invention relates to a multilayer ceramic electronic component that includes external electrodes including plated films provided on the surfaces of a ceramic body.

2. Description of the Related Art

Electronic equipment such as mobile phones, notebook computers, digital cameras, and digital audio equipment is becoming more and more compact. A large number of multilayer ceramic electronic components that enable the size of such an electronic device to be reduced and the performance thereof to be improved are used therein.

A typical multilayer ceramic electronic component includes a ceramic body that includes a plurality of ceramic layers formed on one another, internal electrodes formed inside the ceramic body, and an external electrode formed on a surface of the ceramic body. A multilayer ceramic electronic component is disposed on a conductive land of a mount board and is then mounted onto the board by a conductive bonding material, such as solder.

There is a growing demand for a multilayer ceramic electronic component having a reduced size.

However, in general, the characteristics of a multilayer ceramic electronic component tend to deteriorate when the size of the multilayer ceramic electronic component is reduced because an effective area in which internal electrodes overlap one another is reduced.

In a multi-terminal multilayer ceramic electronic component, it is necessary to form a plurality of external electrodes at a fine pitch. Paste-applying precision in a conventional thick-film paste firing method is limited. Therefore, it is difficult to form external electrodes with high precision when the conventional method is used.

To overcome the above difficulty, a method of forming external electrodes by plating has been proposed. With this method, it is possible to form a thin flat external electrode, which enables an increase in the effective area of the internal electrodes. In addition, since metal is deposited at the exposed edges of internal electrodes, it is possible to form external electrodes with high precision even when a fine pitch is required.

The use of dummy conductors (anchor tabs), for the purpose of improving the reliability of the growth of a plated film when external electrodes are formed directly by plating, that do not substantially contribute to the electric characteristics is disclosed in, for example, Japanese Unexamined Patent Application Publication No. 2004-327983. According to Japanese Unexamined Patent Application Publication No. 2004-327983, if the technique disclosed therein is used, it is possible to deposit metal not only at the exposed edges of internal electrodes but also at the exposed edges of dummy conductors. According to the Japanese Unexamined Patent Application Publication No. 2004-327983, this makes it possible to grow a plated film with increased reliability.

However, even when the method disclosed in the Japanese Unexamined Patent Application Publication No. 2004-327983 is used, a problem of insufficient growth sometimes occurs when attempting to form a plated film by applying electrolytic plating to an electronic component having a small size of, for example, 1608 (approx. 1.6×0.8×0.8 mm) or less. Specifically, with electrolytic plating, a current is applied when a medium, such as a steel ball, is brought into contact with the exposed portions of internal electrodes and dummy conductors. As a result, metal is deposited at the exposed portions. However, as the size of the electronic component is reduced, the area of an exposed portion is reduced. Therefore, the probability of successful contact of the medium and the exposed portion is reduced.

SUMMARY OF THE INVENTION

Preferred embodiments of the present invention provide a multilayer ceramic electronic component that has a structure that overcomes the above-described problems.

A multilayer ceramic electronic component according to a preferred embodiment of the present invention preferably includes a ceramic body that includes a plurality of ceramic layers disposed on one another, the ceramic body including a first main surface and a second main surface arranged opposite to each other, a first side surface and a second side surface arranged opposite to each other, and a first end surface and a second end surface arranged opposite to each other, each of the first main surface, the second main surface, the first side surface, the second side surface, the first end surface, and the second end surface defining a portion of superficies of the ceramic body, a first internal electrode that is provided inside the ceramic body and includes a first overlap section and a first lead-out section, the first lead-out section extending from the first overlap section to a portion of the superficies of the ceramic body, a second internal electrode that is provided inside the ceramic body and includes a second overlap section and at least two second lead-out sections, the second overlap section being arranged opposite to the first overlap section with one of the plurality of ceramic layers sandwiched therebetween, each of the at least two second lead-out sections extending from the second overlap section to a portion of the superficies of the ceramic body, a first external electrode that is provided on a portion of the superficies of the ceramic body and covers an exposed edge of the first lead-out section, and a second external electrode that is provided on a portion or across a portion of the superficies of the ceramic body and includes a plated film that directly covers exposed edges of the second lead-out sections, the second external electrode being connected at a potential that is different from that of the first external electrode.

When a region of the ceramic body in layers in which neither of the first internal electrode and the second internal electrode is provided as viewed in a direction in which the plurality of ceramic layers are provided on one another is defined as a non-effective layer region, a dummy lead-through conductor is provided in the non-effective layer region so as to lead to at least two locations on some portions of the superficies of the ceramic body and to be electrically connected to the second external electrode.

According to a preferred embodiment of the present invention, preferably, the second internal electrode extends continuously from the first side surface to the second side surface, the second external electrode is provided on or extends across the first side surface and the second side surface, and the dummy lead-through conductor extends continuously from the first side surface to the second side surface.

The second external electrode may preferably be provided separately on, or separately and primarily on, the first side surface and the second side surface, such that at least one second external electrode is provided on the first side surface and at least one second external electrode is provided on the second side surface. Alternatively, the plated film of the second external electrode may preferably be arranged to surround the first side surface, the second side surface, the first main surface, and the second main surface.

In the above-described structure, at least a portion of the dummy lead-through conductor may be exposed on the first main surface and the second main surface.

In a structure in which the plated film of the second external electrode is arranged so as to surround the first side surface, the second side surface, the first main surface, and the second main surface, it is preferable for at least a portion of the dummy lead-through conductor to be exposed on the first main surface and the second main surface from the first side surface to the second side surface.

It is also preferable for the first internal electrode to extend continuously from the first end surface to the second end surface, and for the first external electrode to be provided separately on, or separately and primarily on, the first end surface and the second end surface, such that at least one first external electrode is provided on the first end surface and at least one first external electrode is provided on the second end surface.

In a multilayer ceramic electronic component according to a preferred embodiment of the present invention, the dummy lead-through conductor preferably has a rectangular or substantially rectangular shape, for example.

The dummy lead-through conductor is preferably disposed in the non-effective layer region so as to lead to at least two location of the superficies of the ceramic body, or, in other words, so as to lead through the ceramic body. In addition, the dummy lead-through conductor is preferably electrically connected to the second external electrode. Since the dummy lead-through conductor includes edges that are exposed at, at least, two locations of the superficies of the ceramic body, when a conductive medium, such as a steel ball, is brought into contact with one of the plurality of exposed edges of the dummy lead-through conductor, a current is also applied to the other exposed edges. This means that the probability of successful contact with the medium increases, which results in improved electrification efficiency. With this configuration, it is possible to reduce the plating time required to form a plated film as the underlying layer of the second external electrode.

Thus, even though the required size of a multilayer ceramic electronic component is decreasing, it is possible to efficiently form the plated film of the second external electrode efficiently.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
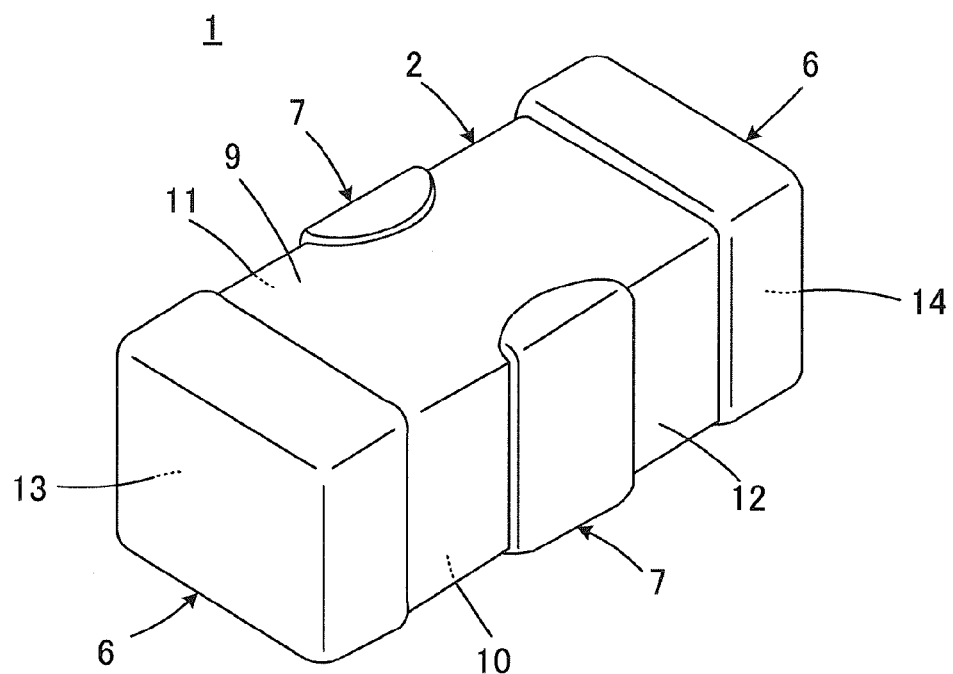
FIG. 1 is a perspective view that illustrates a multilayer ceramic capacitor, which is an example of a multilayer ceramic electronic component according to a first preferred embodiment of the present invention.

The present invention is useful when applied to, though not limited thereto, a multilayer ceramic electronic component having a size of 1608 (approx. 1.6×0.8×0.8 mm) or less, for example. The present invention is especially useful for a multilayer ceramic electronic component having a smaller size of 1005 (approx. 1.0×0.5×0.5 mm), 0603 (approx. 0.6× 0.3×0.3 mm), and 0402 (approx. 0.4×0.2×0.2 mm), for example.

To explain exemplary preferred embodiments of the present invention below, a multilayer ceramic capacitor is described as an example of a multilayer ceramic electronic component.

First Preferred Embodiment

FIGS. 1 to 6 show a first preferred embodiment of the present invention. A multilayer ceramic capacitor 1 according to the first preferred embodiment of the present invention is a preferably three-terminal-type capacitor, for example. The multilayer ceramic capacitor 1 preferably includes a ceramic body 2, a first internal electrode group 3 and a second internal electrode group 4 that are provided inside the ceramic body 2, a dummy lead-through conductor 5 that is provided inside the ceramic body 2, and a first external electrode 6 and a second external electrode 7 that are provided on surfaces or superficies of the ceramic body 2. The structure of the multilayer ceramic capacitor 1 will be described in detail below.

The ceramic body 2 preferably has a substantially rectangular parallelepiped shape, for example. Specifically, the ceramic body 2 includes a first main surface 9 and a second main surface 10 that define a pair of opposite sides, a first side surface 11 and a second side surface 12 that define another pair of opposite sides, and a first end surface 13 and a second end surface 14 that define another pair of opposite sides. The ceramic body 2 preferably has rounded corners and rounded edges.

Figure 2:
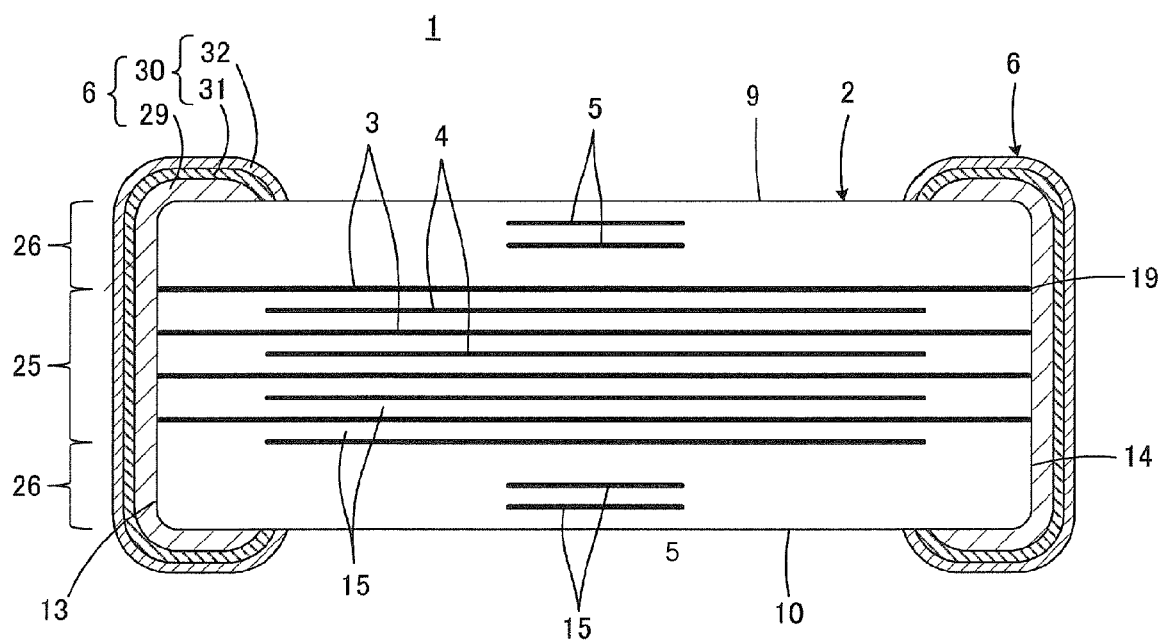
FIG. 2 is a sectional view taken along a plane parallel to the side surfaces of a ceramic body of the multilayer ceramic capacitor illustrated in FIG. 1.

As illustrated in FIG. 2, the ceramic body 2 preferably has a layered structure including a plurality of ceramic layers 15. The plurality of ceramic layers 15 extend in the planar direction of the pair of main surfaces 9 and 10, that is, substantially in parallel therewith. The plurality of ceramic layers 15 are stacked in a direction substantially perpendicular to the pair of main surfaces 9 and 10. Each of the plurality of ceramic layers 15 preferably has a thickness of approximately 0.5 µm to approximately 10 µm, for example. Dielectric ceramic including, for example, $BaTiO_3$, $CaTiO_3$, $SrTiO_3$, $CaZrO_3$, or other suitable dielectric ceramic as a principal component thereof may preferably be used as a ceramic material for the ceramic layers 15. Alternatively, a material including an accessory component, such as a Mn compound, a Mg compound, a Si compound, a Co compound, a Ni compound, or a rare-earth element compound, for example in addition to the above-described principal component may preferably be used.

Figure 4:
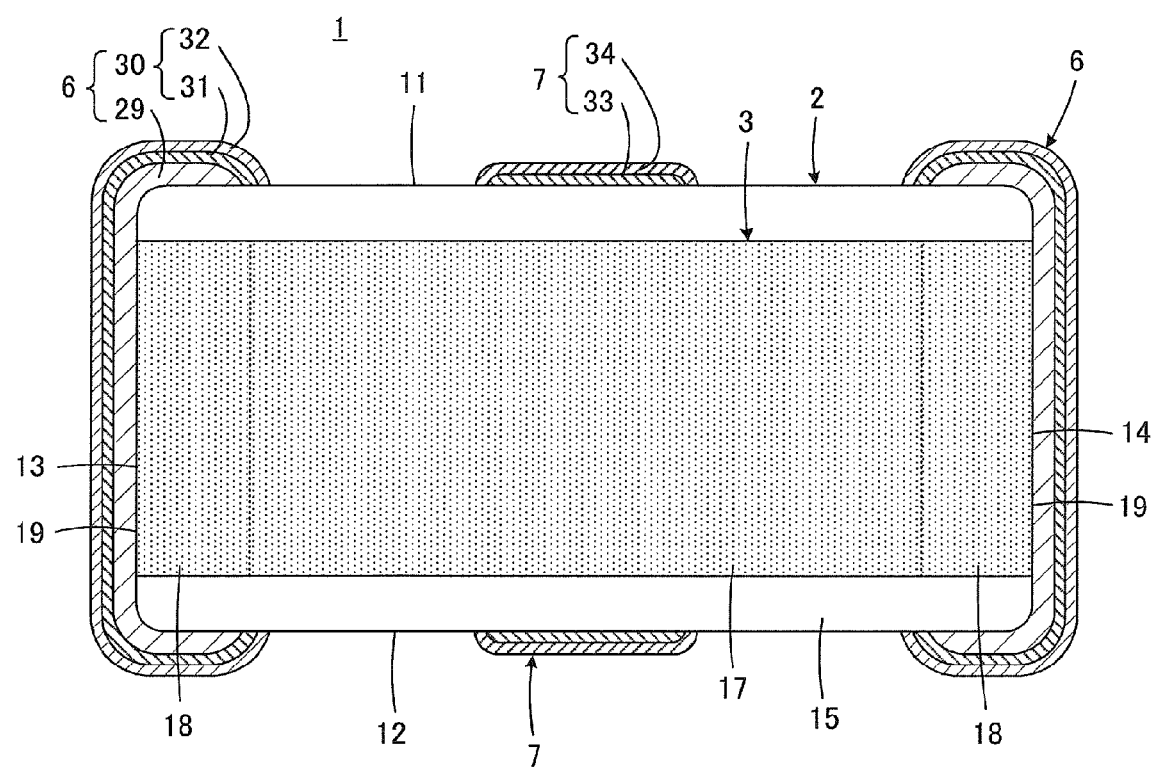
FIG. 4 is a sectional view taken along a plane parallel to the main surfaces of the ceramic body of the multilayer ceramic capacitor illustrated in FIG. 1, wherein a first internal electrode extends along the plane.
Figure 5:
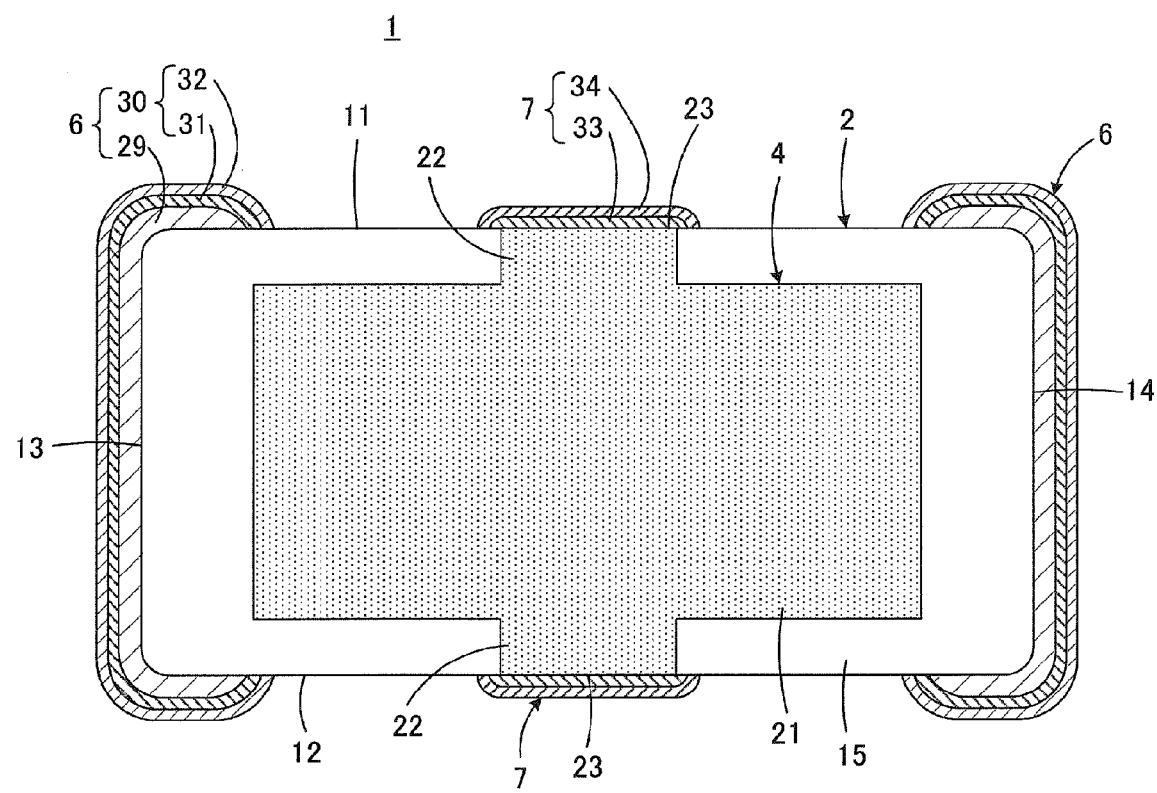
FIG. 5 is a sectional view taken along a plane parallel to the main surfaces of the ceramic body of the multilayer ceramic capacitor illustrated in FIG. 1, wherein a second internal electrode extends along the plane.
Figure 6:
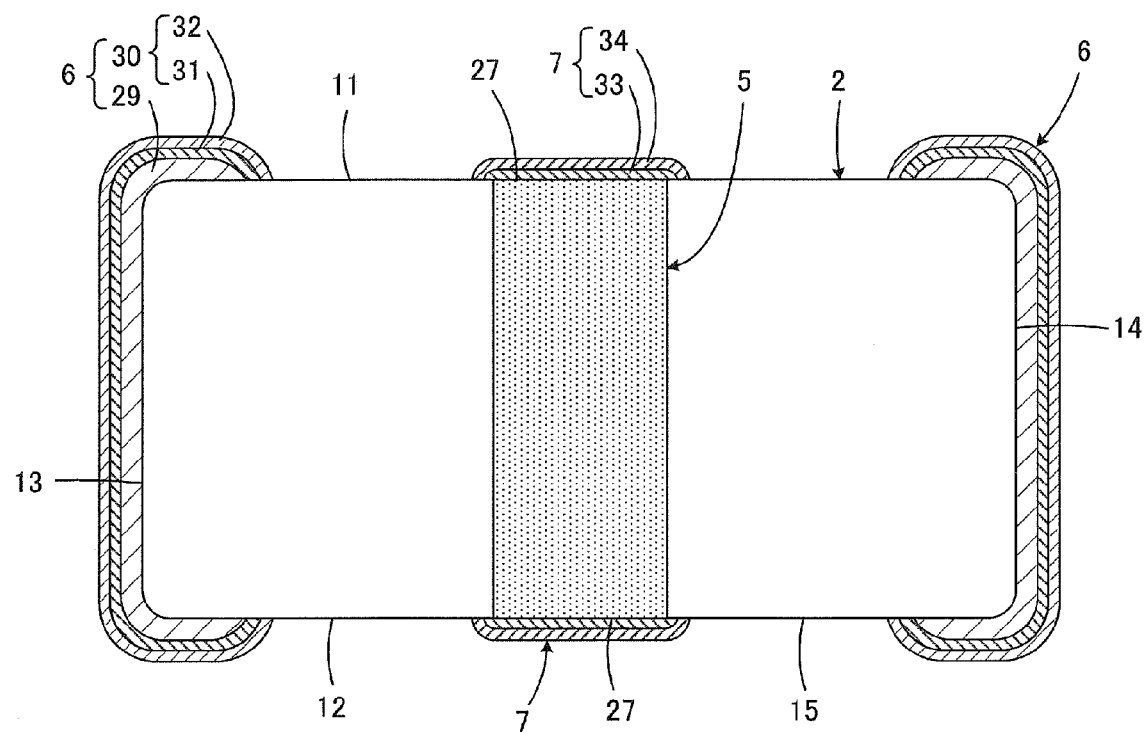
FIG. 6 is a sectional view taken along a plane parallel to the main surfaces of the ceramic body of the multilayer ceramic capacitor illustrated in FIG. 1, wherein a dummy lead-through conductor extends along the plane.

The internal electrodes of the multilayer ceramic capacitor 1 preferably include a plurality of first internal electrodes 3, one of which is illustrated in FIG. 4, and a plurality of second internal electrodes 4, one of which is illustrated in FIG. 5. The plurality of first internal electrodes 3 and the plurality of second internal electrodes 4 are preferably alternately arranged in the layer direction of the ceramic body 2.

As illustrated in FIG. 4, the first internal electrode preferably includes a first overlap section 17 and a first lead-out portion 18. The first overlap section 17 overlaps the second internal electrode 4 provided in the layer next to the layer of the first overlap section 17. The first lead-out portion 18 extends from the first overlap section 17 to a surface of the ceramic body 2. In FIG. 4, a broken line indicates a boundary between the first overlap section 17 and the first lead-out portion 18 in the first internal electrode 3. More specifically, in the first preferred embodiment, the first internal electrode 3 preferably has a substantially rectangular shape. The first internal electrode 3 according to the first preferred embodiment preferably includes two first lead-out portions 18. One of the two first lead-out portions 18 includes an edge 19 that is exposed at the first end surface 13. The other one of the two first lead-out portions 18 includes an edge 19 that is exposed at the second end surface 14. In other words, the first internal electrode 3 extends continuously from the first end surface 13 to the second end surface 14.

As illustrated in FIG. 5, the second internal electrode 4 preferably includes a second overlap section 21 and at least two second lead-out portions 22. The second overlap section 21 overlaps the first internal electrode 3 provided in the layer next to the layer of the second overlap section 21. Each of the second lead-out portions 22 extends from the second overlap section 21 to a surface of the ceramic body 2. More specifically, in the first preferred embodiment, the second internal electrode 4 is preferably substantially cross-shaped, for example, so as to include two second lead-out portions 22. One of the two second lead-out portions 22 includes an edge 23 that is exposed at the first side surface 11. The other of the two second lead-out portions 22 includes an edge 23 that is exposed at the second side surface 12. In other words, the second internal electrode 4 preferably extends continuously from the first side surface 11 to the second side surface 12.

For example, Ni, Cu, Ag, Pd, Ag—Pd alloy, Au, or other suitable material may preferably be used as a conductive material for the first internal electrodes 3 and the second internal electrodes 4.

Each of the plurality of first internal electrodes 3 and the plurality of second internal electrodes 4 preferably has a thickness of approximately 0.3 µm to approximately 2.0 µm, for example.

Electrostatic capacitance is generated at the overlapping region at which the first overlap section 17 of the first internal electrode 3 and the adjacent-layer-side overlap area portion 21 of the second internal electrode 4 are arranged opposite to each other with the ceramic layer 15 sandwiched therebetween. As illustrated in FIG. 2, the above-described region of the ceramic body 2 in layers is defined herein as an effective layer region 25. On the other hand, a region of the ceramic body 2 in layers in which neither of the plurality of first internal electrodes 3 and the plurality of second internal electrodes 4 are provided when viewed in the direction in which the plurality of ceramic layers 15 are stacked on one another is defined herein as a non-effective layer region 26. The non-effective layer region 26 is otherwise referred to as "outer layers". In the first preferred embodiment, the non-effective layer region 26 is preferably located in the vicinity of both of the first main surface 9 of the ceramic body 2 and the second main surface 10 thereof.

Figure 3:
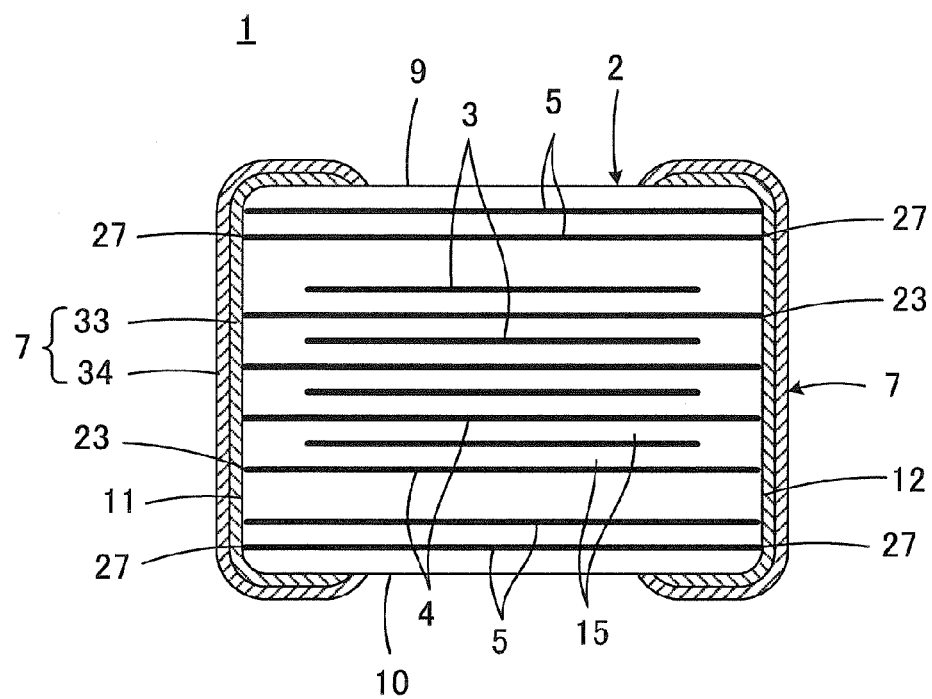
FIG. 3 is a sectional view taken along a plane parallel to the end surfaces of the ceramic body of the multilayer ceramic capacitor illustrated in FIG. 1.

As illustrated in FIGS. 2 and 3, the plurality dummy lead-through conductors 5 are preferably provided in the non-effective layer region 26.

The dummy lead-through conductor 5 extends to at least two surfaces of the ceramic body 2. More specifically, the dummy lead-through conductor 5 according to the first preferred embodiment, which preferably has a substantially rectangular shape, for example, extends to two locations of two surfaces of the ceramic body 2, one of the two locations is on the first side surface 11, and the other of the two locations is on the second side surface 12. In other words, the dummy lead-through conductor 5 extends continuously from the first side surface 11 to the second side surface 12. Accordingly, the dummy lead-through conductor 5 includes an edge 27 that is exposed at the first side surface 11 and an edge 27 that is exposed at the second side surface 12.

Since the dummy lead-through conductor 5 preferably includes the exposed edges 27 at, at least, two locations as described above, when a medium such as a steel ball is brought into contact with an exposed edge 27, a current is also applied to the other exposed edge or edges 27. That is, since the dummy lead-through conductor 5 includes the exposed edges 27 at at least two locations, the probability of successful contact with the medium is increased, which results in higher electrification efficiency. With this configuration, it is possible to reduce the plating time required to form a plated film that functions as the underlying layer of the second external electrode 7, which will be described later.

The dummy lead-through conductor 5 does not significantly contribute to the formation of electrostatic capacitance. However, there is a possibility that electrostatic capacitance might be formed between, among the plurality of dummy lead-through conductors 5, one that is in the layer that is the closest to the effective layer region 25 and, among the plurality of first internal electrodes 3, one in the uppermost/lowermost layer in the effective layer region 25. However, the structure can be designed so as to ensure that the electrostatic capacitance is minimized even when it is formed therebetween. For example, the distance between the dummy lead-through conductor 5 and the first internal electrode 3 is preferably set to be greater than the distance between the first internal electrode 3 and the second internal electrode 4. Alternatively, the area at which the dummy lead-through conductor 5 and the first internal electrode 3 overlap is preferably set to be less than the area at which the first internal electrode 3 and the second internal electrode 4 overlap. Another way to minimize the capacitance is to arrange the second internal electrodes 4 in the uppermost and lowermost layers in the effective layer region 25.

As illustrated in FIGS. 2 and 3, the dummy lead-through conductors 5 are preferably provided in layers as viewed in the direction in which the plurality of ceramic layers 15 are stacked on one another. Approximately 10 to 60 sheets of dummy lead-through conductor 5, for example, are preferably provided in each of the non-effective layer regions 26. Such a preferred structure facilitates the growth of a plated film that functions as the underlying layer of the second external electrode 7 on the first side surface 11 and the second side surface 12 (at the height corresponding to the non-effective layer region 26).

The dummy lead-through conductor 5 is preferably made of the same or substantially the same material as that of the internal electrodes 3 and 4. For example, as described above, Ni, Cu, Ag, Pd, Ag—Pd alloy, Au, or other suitable material may preferably be used as a conductive material for the dummy lead-through conductor 5.

Preferably, the dummy lead-through conductor 5 has a thickness of about 0.3 µm to about 2.0 µm, for example.

The first external electrode 6 is provided substantially on the first end surface 13 of the ceramic body 2. In addition, the first external electrode 6 is provided substantially on the second end surface 14 thereof. More specifically, in the first preferred embodiment, at one end, the first external electrode 6 preferably extends from the first end surface 13 onto the first main surface 9, the second main surface 10, the first side surface 11, and the second side surface 12 by turning around the respective edges. The same applies for the other end, except that the first external electrode 6 extends from the second end surface 14.

At each of the two ends, the first external electrode 6 covers the exposed edge 19 of the first lead-out portion 18 of each of the plurality of first internal electrodes 3 such that the first external electrode 6 is electrically connected to the first internal electrodes 3. As illustrated in FIGS. 2, 4, 5, and 6, the first external electrode 6 preferably includes an underlying layer 29 that is in contact with the exposed edge 19 of the first lead-out portion 18 of each of the plurality of first internal electrodes 3 and an upper layer 30 that is provided on the underlying layer 29 if required.

The underlying layer 29 may be formed as a sintered metal film, a conductive resin film, or other suitable film. To form the underlying layer 29 as a sintered metal film, the material of the underlying layer 29 may preferably be co-fired with the ceramic body 2, the first internal electrodes 3, and the second internal electrodes 4 to obtain the sintered metal film. Alternatively, a conductive paste may preferably be applied to the fired ceramic body 2, followed by firing, that is, post firing, to obtain the sintered metal film. A mixture of thermosetting resin and filler metal can be used as conductive resin to form the underlying layer 29 as a conductive resin film.

For example, Cu, Ni, Ag, Pd, Ag—Pd alloy, Au, or other suitable metal may preferably be used as metal for the underlying layer 29.

When the underlying layer 29 is formed as a sintered metal film or a conductive resin film, the underlying layer 29 preferably has a thickness of about 10 µm to about 50 µm at its thickest portion, for example.

The upper layer 30 is preferably a plated film. For example, Cu, Ni, Ag, Pd, Ag—Pd alloy, Au, Sn, Pb, Pd, Bi, Zn, or other suitable metal may preferably be used as a metal for the plated film. The plated film functioning as the upper layer 30 may preferably include a plurality of sub-layers. The upper layer 30 illustrated in the accompanying drawings includes a first plated sub-layer 31 and a second plated sub-layer 32. The second plated sub-layer 32 is formed on the first plated sub-layer 31. In the above-described structure, the first plated sub-layer 31 and the second plated sub-layer 32 are preferably a Ni-plated film and a Sn-plated film, respectively, for example.

The plated film defining the upper layer 30 preferably has a thickness of about 1 µm to about 10 µm per stratum.

The second external electrode 7 is connected at a potential that is different from that of the first external electrode 6. The second external electrode 7 is provided substantially on the first side surface 11 of the ceramic body 2. In addition, the second external electrode 7 is provided substantially on the second side surface 12 thereof. More specifically, in the first preferred embodiment, the second external electrodes 7 are preferably defined by a pair of short electrode strips. At one side, the band-shaped second external electrode 7 illustrated in the accompanying drawings extends from the first side surface 11 onto the first main surface 9 and the second main surface 10 by turning around the respective edges. The same applies for the other side, except that the second external electrode 7 extends from the second side surface 12. It is not always necessary for the second external electrode 7 to be partially disposed on the first main surface 9 and the second main surface 10. The second external electrodes 7 may preferably be provided on only the first side surface 11 and the second side surface 12, respectively.

At each of the two sides, preferably, the second external electrode 7 directly covers the exposed edge 23 of the second lead-out portion 22 of each of the plurality of second internal electrodes 4 and the exposed edge 27 of each of the plurality of dummy lead-through conductors 5 such that the second external electrode 7 is electrically connected to the second internal electrodes 4 and dummy lead-through conductors 5. As illustrated in FIGS. 3 to 6, the second external electrode 7 preferably includes an underlying layer 33 that is in contact with the exposed edge 23 of the second lead-out portion 22 of each of the plurality of second internal electrodes 4 and further includes an upper layer 34 that is provided on the underlying layer 33 if needed.

The underlying layer 33 is preferably a plated film. For example, Cu, Ni, Ag, Pd, Ag—Pd alloy, Au, Sn, Pb, Pd, Bi, Zn, or other suitable metal may preferably be used as metal for the plated film. The plated film preferably has a thickness of about 1 µm to about 15 µm at its thickest portion, for example. The plated film preferably does not contain any glass component. A preferred metal percentage of the plated film per unit volume is about 99 percent by volume or greater, for example.

If the upper layer 34 is provided as a layer component of the second external electrode 7, the underlying layer 33 and the upper layer 34 described above are preferably a Ni-plated film and a Sn-plated film, respectively, for example.

The multilayer ceramic capacitor 1 is, for example, preferably manufactured as follows.

Ceramic green sheets that will be formed into the ceramic layers 15, a conductive paste for forming internal electrodes, and a conductive paste for forming external electrodes are prepared. The internal-electrode conductive paste is preferably also used as a conductive paste for forming dummy lead-through conductors. Each of the ceramic green sheet, the internal-electrode conductive paste, and the external-electrode conductive paste includes a binder and a solvent. A known organic binder and a known organic solvent may preferably be used.

The internal-electrode conductive paste is applied to the surface of a ceramic green sheet by printing a predetermined pattern thereon. For example, screen printing is preferably used to apply the paste thereto, thereby forming an internal-electrode pattern and a dummy-lead-through-conductor pattern.

A predetermined number of outer-layer ceramic green sheets, that is, sheets on which the internal-electrode pattern is not printed, a predetermined number of ceramic green sheets on which the dummy-lead-through-conductor pattern is printed, and a predetermined number of ceramic green sheets on which the internal-electrode pattern is printed, are stacked on one another in a predetermined sequential order to produce a mother layered body.

The mother layered body is pressed in the layer direction by isostatic pressing or other suitable pressing, for example.

The mother layered body is cut into a predetermined size to obtain a raw ceramic body.

A firing process is performed on the raw ceramic body. The ceramic body 2 illustrated in the accompanying drawings is obtained as a result of the firing process. A preferable range of firing temperatures is about 900 degrees C. to about 1,300 degrees C., for example. However, the firing temperature depends on the ceramic material and the material of the internal electrodes.

The ceramic body 2 is thereafter barrel-polished if necessary. The barrel polishing rounds the corners and edges of the ceramic body 2.

The external-electrode conductive paste is applied to the first end surface 13 of the fired ceramic body 2 and the second end surface 14 thereof, followed by firing, thereby forming the underlying layer 29 of the first external electrode 6 at each of the two ends. A preferable range of firing temperatures is about 700 degrees C. to about 900 degrees C., for example.

The ceramic body 2 with the underlying layer 29 formed thereon goes through a plating process to form the first plated sub-layer 31 of the upper layer 30 on the underlying layer 29 of the first external electrode 6 and, in addition, to form the underlying layer 33 of the second external electrode 7. Electrolytic plating using a rotary barrel method, for example, is preferably used. A conductive medium, such as a steel ball, a steel shot, or a soldering ball, for example, is preferably used in the plating process.

Since each of the plurality of dummy lead-through conductors 5 includes two exposed edges 27, in a plating process, when the conductive medium is brought into contact with one of the two exposed edges 27, a current is also applied to the other exposed edge 27. This significantly increases the probability of successful contact with the medium, which results in higher electrification efficiency. Thus, it is possible to reduce the plating time required to form the underlying layer 33 of the second external electrode 7.

It is preferable to perform heat treatment at a temperature ranging from about 600 degrees C. to about 900 degrees C., for example, after the plating process. Thus, the adhesion of the plated film to the ceramic body 2 is effectively improved.

If required, a further plating process may be performed on the ceramic body 2 to form the second plated sub-layer 32 of the upper layer 30 of the first external electrode 6 and, in addition, to form the upper layer 34 of the second external electrode 7.

The manufacturing of the multilayer ceramic capacitor 1 is completed in this manner.

Second Preferred Embodiment

Figure 7:
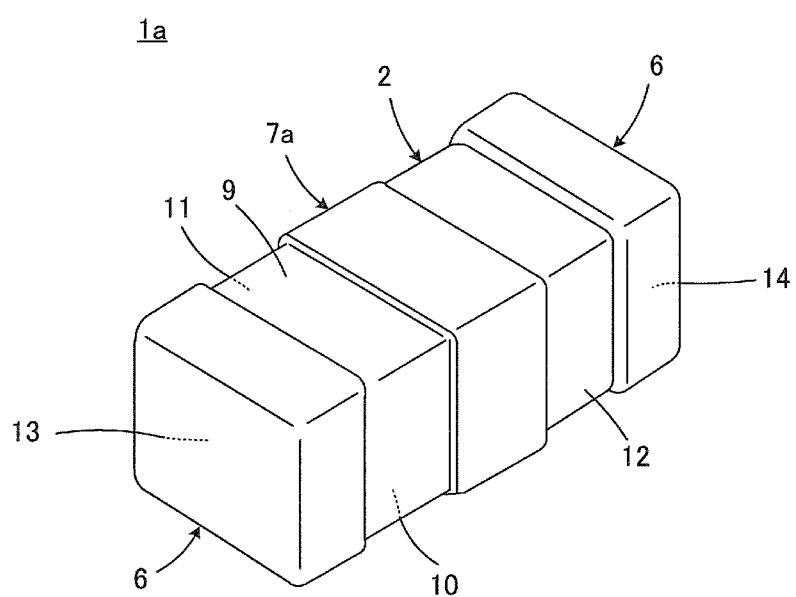
FIG. 7 is a perspective view that illustrates a multilayer ceramic capacitor, which is an example of a multilayer ceramic electronic component according to a second preferred embodiment of the present invention.
Figure 8:
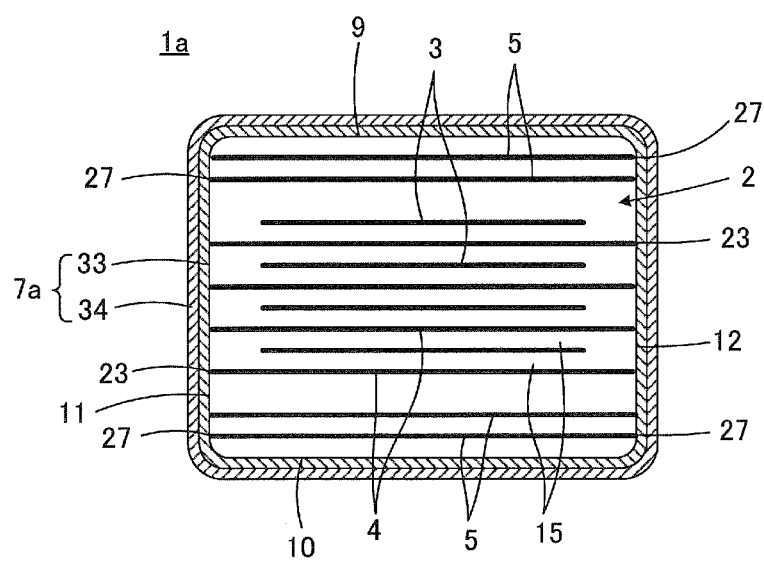
FIG. 8 is a sectional view taken along a plane parallel to the end surfaces of the ceramic body of the multilayer ceramic capacitor illustrated in FIG. 7.
Figure 9:
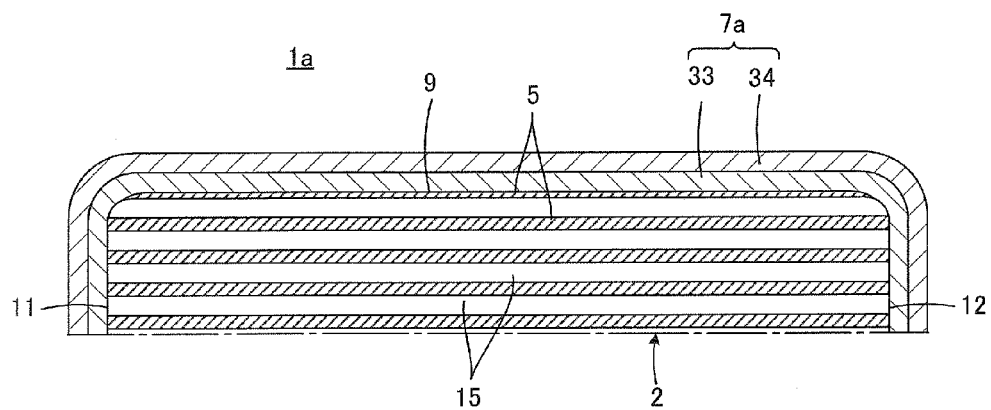
FIG. 9 is a partially enlarged view of FIG. 8.

A second preferred embodiment of the present invention is illustrated in FIGS. 7, 8, and 9. In FIGS. 7, 8, and 9, the same reference numerals are assigned to elements that correspond to those illustrated in FIGS. 1 to 6 to avoid redundant description.

A multilayer ceramic capacitor 1a according to the second preferred embodiment of the present invention preferably includes a second external electrode 7a including an underlying layer 33 and an upper layer 34 that is provided around the first side surface 11, the second side surface 12, the first main surface 9, and the second main surface 10 of the ceramic body 2.

In the process of growth that occurs during plating to form the underlying layer 33 of the second external electrode 7a, a plated film is preferably formed so as to surround the ceramic body 2. This increases the size of an electrode area that may function as a plating point for deposition. Therefore, electrification efficiency is improved, which increases the thickness of a film that may be formed per unit time. According to the second preferred embodiment, the time required to form a film having a predetermined thickness is reduced when forming the underlying layer 33 of the second external electrode 7, which reduces the cost.

In the first preferred embodiment of the present invention described above, the second external electrode 7 preferably includes ends disposed on the main surfaces 9 and 10 of the ceramic body 2, respectively. When, for example, the distortion of a substrate on which the multilayer ceramic capacitor 1 is mounted exerts a stress to an end of the second external electrode 7, there is a risk that the underlying layer 33 may begin to detach at the stress-exerted end. In contrast, since the second external electrode 7a in the second preferred embodiment is endless, the structure is less likely to detach from the layer.

In addition, in the first preferred embodiment, the end of the underlying layer 33 of the second external electrode 7 on the main surfaces 9 and 10 might act as an inlet through which a plating liquid that is used to form the upper layer 34 infiltrates. This poses a risk of reducing the reliability of the structure. In contrast, in the second preferred embodiment, since there is no tip region in the underlying layer 33 of the second external electrode 7a, the structure does not substantially suffer from the problem of low reliability.

Moreover, since the second external electrode 7a is formed as a plated film that surrounds the ceramic body 2, the second external electrode 7a has a smooth structure along the underlying surfaces of the ceramic body 2. Due to the smoothness, the multilayer ceramic capacitor 1a can be stably mounted.

In the second preferred embodiment, at least a portion of the dummy lead-through conductor 5 is preferably exposed on the first main surface 9 and the second main surface 10 from the first side surface 11 to the second side surface 12 as shown, for example, in FIG. 9, which illustrates the first-main-surface side. With this preferred configuration, plating points for deposition are included in the first main surface 9 and the second main surface 10, which facilitates the formation of a plated film as the underlying layer 33 of the second external electrode 7a around the ceramic body 2.

It is not always necessary for the entire surface of the dummy lead-through conductor 5 to be exposed on the main surfaces 9 and 10. There may be discontinuously exposed portions (e.g., spots) of the dummy lead-through conductor 5. However, the exposed portions of the dummy lead-through conductor 5 on the main surfaces 9 and 10 are preferably distributed uniformly from the first side surface 11 to the second side surface 12. In addition, the dummy lead-through conductor 5 is preferably exposed continuously from the first side surface 11 to the second side surface 12. If there is a continuously exposed portion, even a relatively small continuously exposed portion, of the dummy lead-through conductor 5 from the first side surface 11 to the second side surface 12, an electrification area extends all the way from the first side surface 11 to the second side surface on the main surfaces 9 and 10. Therefore, electrification efficiency is the highest in this case.

The dummy lead-through conductor 5 may preferably be exposed on the first main surface 9 and the second main surface 10 by, for example, scraping off some ceramic layers 15 located near the first main surface 9 and the second main surface 10 in a barrel-polishing process after firing. Alternatively, sandblasting may preferably be used to expose the dummy lead-through conductor 5.

Third Preferred Embodiment

A third preferred embodiment of the present invention is illustrated in FIGS. 10 to 14. In FIGS. 10 to 14, the same reference numerals are assigned to elements that correspond to those illustrated in FIGS. 1 to 6 to avoid redundant description.

A multilayer ceramic capacitor 1b according to the third preferred embodiment of the present invention preferably includes a first external electrode 6b in which an underlying layer 29b that is in contact with the exposed edge 19 of the first lead-out portion 18 of each of the plurality of first internal electrodes 3 is provided as a plated film.

Conditions for forming the plated film functioning as the underlying layer 29b described above are preferably the same or substantially the same as those for forming the plated film functioning as the underlying layer 33 of the second external electrode 7. Thus, it is possible to form the underlying layer 29b of the first external electrode 6b and the underlying layer of the second external electrode 7 concurrently through a plating process.

Since the underlying layer 29b of the first external electrode 6b is preferably formed as a plated film, an upper layer 30b formed on the underlying layer 29b may include a monolayer structure. In such a case, the underlying layer 29b and the upper layer 30b are preferably a Ni-plated film and a Sn-plated film, respectively.

Figure 10:
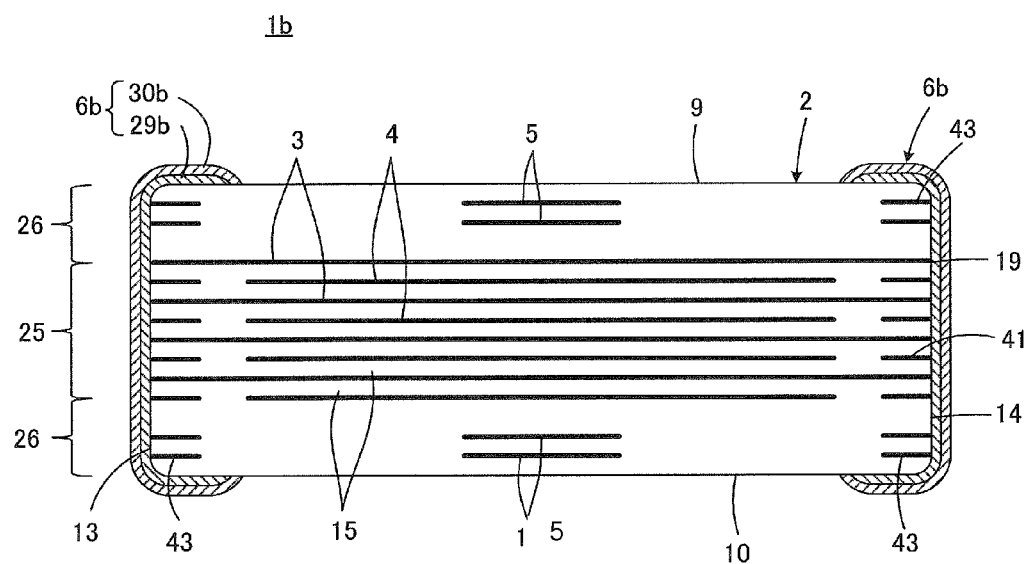
FIG. 10 is a sectional view that illustrates a multilayer ceramic capacitor, which is an example of a multilayer ceramic electronic component according to a third preferred embodiment of the present invention, wherein the sectional view is taken along a plane parallel to the side surfaces of the ceramic body thereof.
Figure 12:
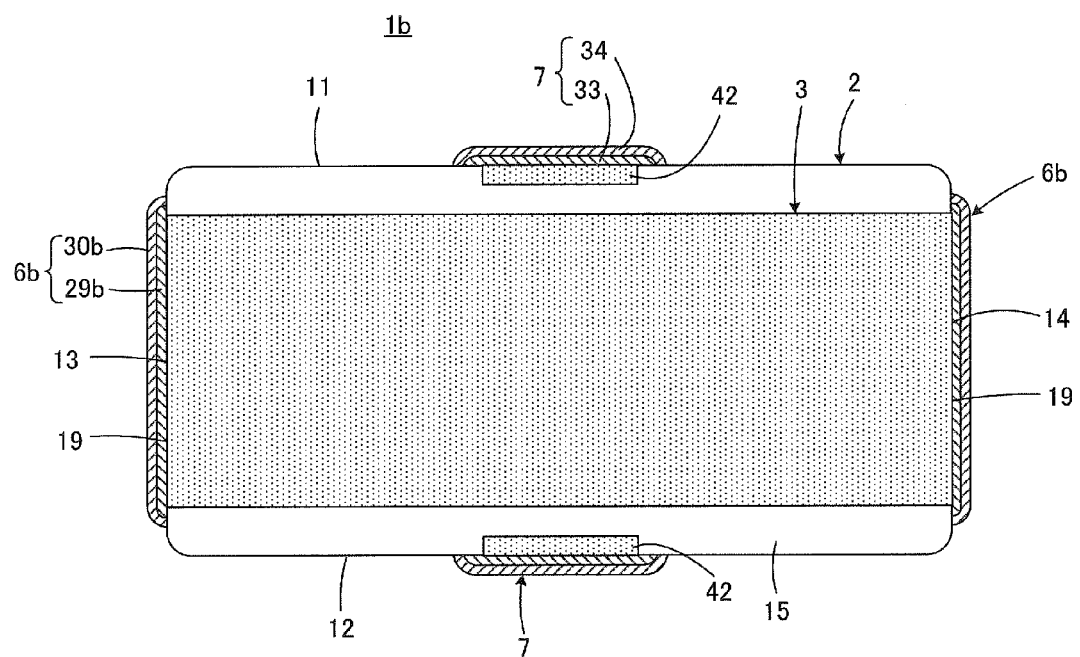
FIG. 12 is a sectional view taken along a plane parallel to the main surfaces of the ceramic body of the multilayer ceramic capacitor illustrated in FIG. 10, wherein the first internal electrode extends along the plane.
Figure 13:
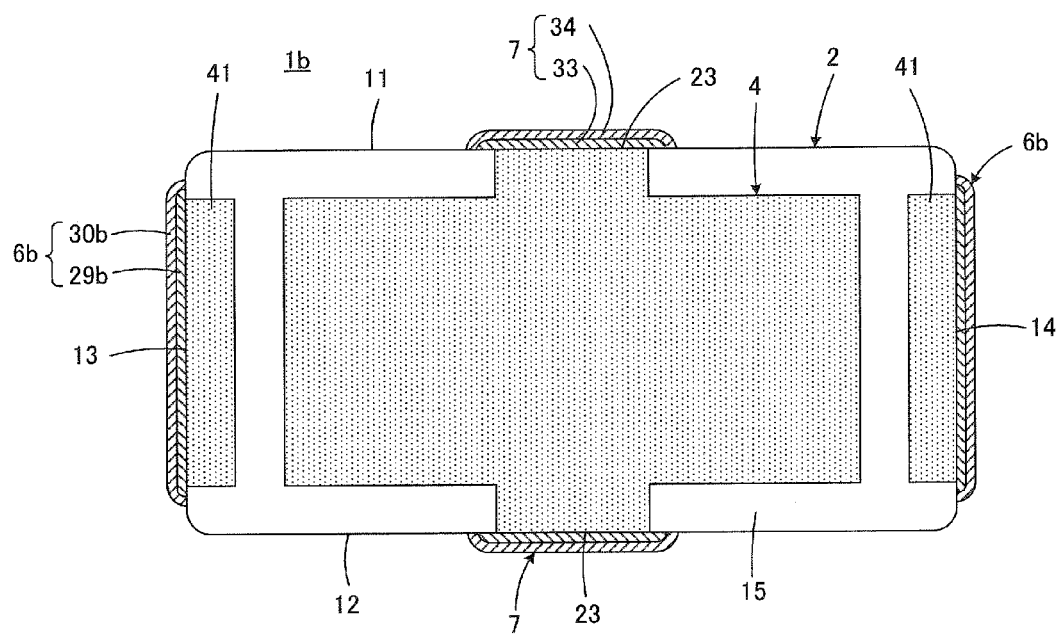
FIG. 13 is a sectional view taken along a plane parallel to the main surfaces of the ceramic body of the multilayer ceramic capacitor illustrated in FIG. 10, wherein the second internal electrode extends along the plane.
Figure 14:
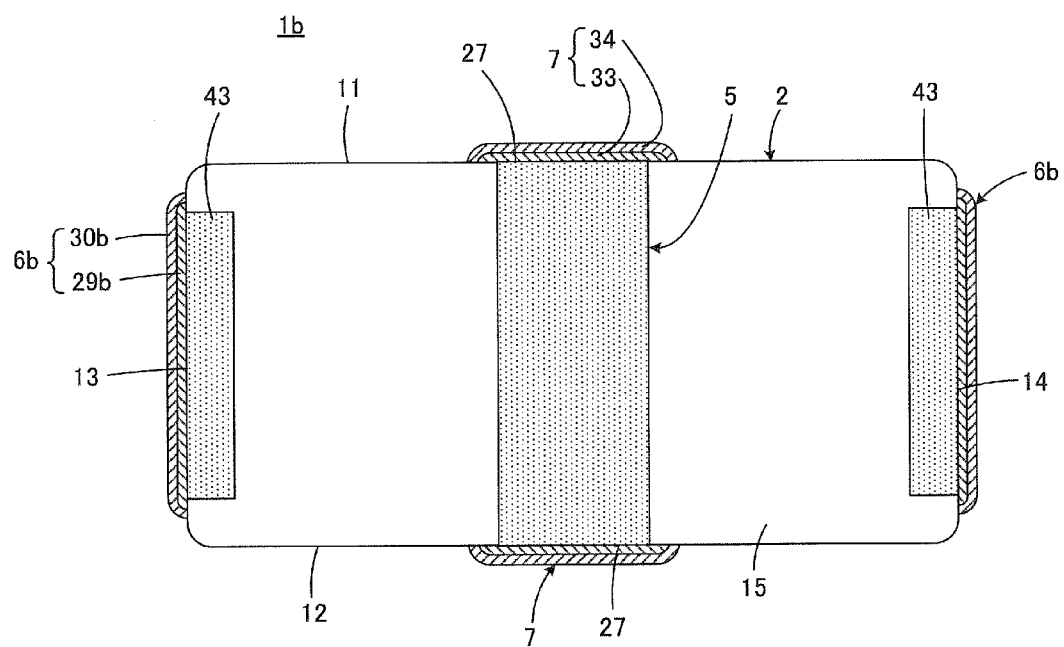
FIG. 14 is a sectional view taken along a plane parallel to the main surfaces of the ceramic body of the multilayer ceramic capacitor illustrated in FIG. 10, wherein the dummy lead-through conductor extends along the plane.

As will be understood from FIGS. 12, 13, and 14, in the third preferred embodiment, the first external electrode 6b is preferably configured as a short electrode strip. The first external electrode 6b does not include any portion that is provided on the first side surface 11 or the second side surface 12. In FIG. 10, the first external electrode 6b is illustrated as an electrode that is partially provided on the first main surface 9 and the second main surface 10. However, it is not always necessary for the first external electrode 6b to be partially provided on the first main surface 9 and the second main surface 10. The electrode strips 6 may be preferably provided on the first end surface 13 and the second end surface 14 only, respectively.

Figure 11:
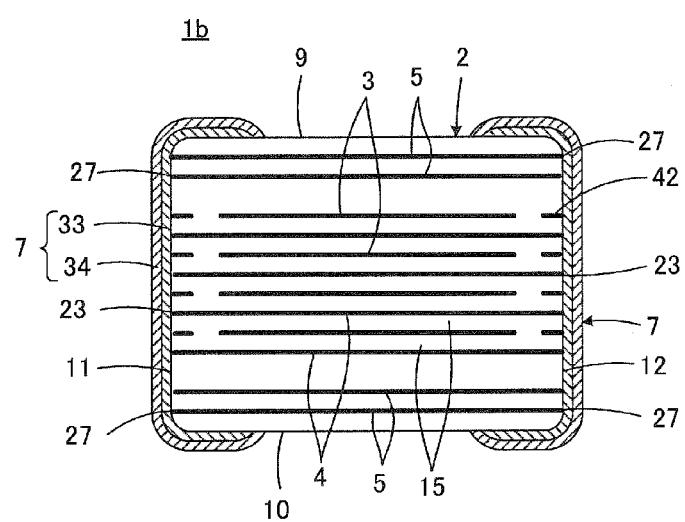
FIG. 11 is a sectional view taken along a plane parallel to the end surfaces of the ceramic body of the multilayer ceramic capacitor illustrated in FIG. 10.

In the third preferred embodiment, dummy electrodes are preferably provided in order to facilitate the growth of a plated film formed as the underlying layer 29b of the first external electrode 6b and a plated film formed as the underlying layer 33 of the second external electrode 7. More specifically, as illustrated in FIGS. 10 and 13, first dummy electrodes 41 are preferably provided on the same planes as those of the second internal electrodes 4. As illustrated in FIGS. 11 and 12, second dummy electrodes 42 are preferably provided on the same planes as those of the first internal electrodes 3. As illustrated in FIGS. 10 and 14, third dummy electrodes 43 are preferably provided on the same planes as those of the dummy lead-through conductors 5. The first dummy electrode 41 and the third dummy electrode 43 are connected to the first external electrode 6b. The second dummy electrode 42 is connected to the second external electrode 7.

The first to third dummy electrodes 41 to 43 function as plating points for forming a plated film as the underlying layer 29b of the first external electrode 6b, and a plated film as the underlying layer 33 of the second external electrode 7, thereby improving electrification efficiency. In addition, the first to third dummy electrodes 41 to 42 increase the strength of the ceramic body 2.

The first, second, and third dummy electrodes 41, 42, and 43 are preferably made of the same or substantially the same metal material as that of the internal electrodes 3 and 4 and the dummy lead-through conductors 5, for example.

Figure 15:
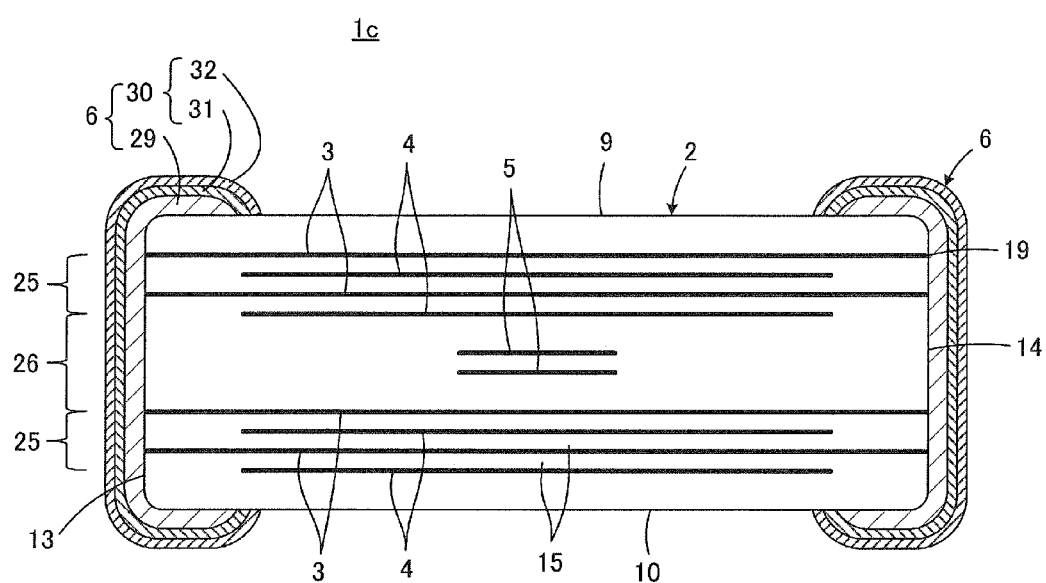
FIG. 15 is a sectional view that illustrates a multilayer ceramic capacitor, which is an example of a multilayer ceramic electronic component according to a fourth preferred embodiment of the present invention, wherein the sectional view is taken along a plane parallel to the side surfaces of the ceramic body thereof.
Figure 16:
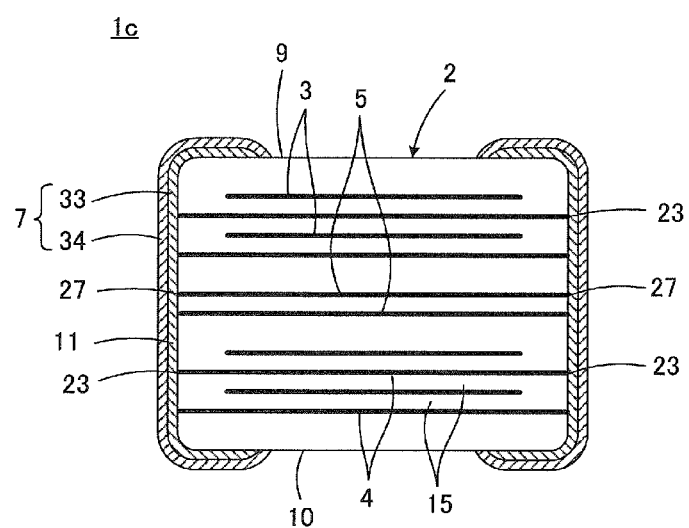
FIG. 16 is a sectional view taken along a plane parallel to the end surfaces of the ceramic body of the multilayer ceramic capacitor illustrated in FIG. 15.

A fourth preferred embodiment of the present invention is illustrated in FIGS. 15 and 16. In FIGS. 15 and 16, the same reference numerals are assigned to elements that correspond to those illustrated in FIGS. 1 to 6 to avoid redundant description.

A multilayer ceramic capacitor 1c according to the fourth preferred embodiment of the present invention preferably includes an effective layer region 25 that is separated in two portions as viewed in the direction in which the plurality of ceramic layers 15 are stacked on one another, more specifically, an upper region and a lower region. Intermediate layers sandwiched between the two portions function as the non-effective layer region 26. The dummy lead-through conductors 5 are preferably provided in the non-effective layer region 26.

In the fourth preferred embodiment, the intermediate layers functioning as the non-effective layer region 26 reduce internal stress attributable to a difference between the contraction percentage of ceramics of the ceramic layers 15 and the contraction percentage of metal of the internal electrodes 3 and 4.

The scope of preferred embodiment of the present invention is not limited to a multilayer ceramic capacitor described above. Preferred embodiments of invention may be applied to various multilayer ceramic electronic components. For example, when the ceramic body is made of piezoelectric ceramics, preferred embodiments of the present invention may be embodied as a multilayer ceramic electronic component that functions as a piezoelectric component. When the ceramic body is made of semiconductive ceramics such as spinel ceramics, preferred embodiments of the present invention may be embodied as a multilayer ceramic electronic component that functions as a thermistor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a ceramic body that includes a plurality of ceramic layers stacked on one another, the ceramic body including a first main surface and a second main surface opposite to each other, a first side surface and a second side surface opposite to each other, and a first end surface and a second end surface opposite to each other, each of the first main surface, the second main surface, the first side surface, the second side surface, the first end surface, and the second end surface defining a portion of superficies of the ceramic body;
a first internal electrode provided inside the ceramic body and including a first overlap section and a first lead-out section, the first lead-out section extending from the first overlap section to a portion of the superficies of the ceramic body;
a second internal electrode provided inside the ceramic body and including a second overlap section and at least two second lead-out sections, the second overlap section being arranged opposite to the first overlap section with one of the plurality of ceramic layers sandwiched therebetween, each of the at least two second lead-out sections extending from the second overlap section to a portion of the superficies of the ceramic body;
a first external electrode provided on a portion of the superficies of the ceramic body and covering an exposed edge of the first lead-out section;
a second external electrode provided on a portion or across a portion of the superficies of the ceramic body and including a plated film directly covering exposed edges of the second lead-out sections, the second external electrode being connected at a potential that is different from that of the first external electrode;
a dummy electrode electrically connected to the first external electrode and opposed to the first lead-out section; and
a dummy lead-through conductor; wherein
when a region of the ceramic body in layers of the plurality of ceramic layers in which neither of the first internal electrode and the second internal electrode is provided as viewed in a direction in which the plurality of ceramic layers are stacked one on another is defined as a non-effective layer region, the dummy lead-through conductor is provided in the non-effective layer region and arranged to extend through only a middle portion of the ceramic body when viewed in the direction in which the plurality of ceramic layers are stacked one on another to at least two locations on portions of the superficies of the ceramic body and to be electrically connected to the second external electrode.

2. The multilayer ceramic electronic component according to claim 1, wherein the second internal electrode extends continuously from the first side surface to the second side surface, the second external electrode is provided on or across the first side surface and the second side surface, and the dummy lead-through conductor extends continuously from the first side surface to the second side surface.

3. The multilayer ceramic electronic component according to claim 2, wherein the second external electrode is provided separately on, or separately and primarily on, the first side surface and the second side surface, at least one second external electrode being provided on the first side surface and at least one second external electrode being provided on the second side surface.

4. The multilayer ceramic electronic component according to claim 2, wherein the plated film of the second external electrode extends around the first side surface, the second side surface, the first main surface, and the second main surface.

5. The multilayer ceramic electronic component according to claim 3, wherein at least a portion of the dummy lead-through conductor is exposed on the first main surface and the second main surface.

6. The multilayer ceramic electronic component according to claim 4, wherein at least a portion of the dummy lead-through conductor is exposed on the first main surface and the second main surface from the first side surface to the second side surface.

7. The multilayer ceramic electronic component according to claim 2, wherein the first internal electrode extends continuously from the first end surface to the second end surface, and the first external electrode is provided separately on, or separately and primarily on, the first end surface and the second end surface, at least one first external electrode being provided on the first end surface and at least one first external electrode being provided on the second end surface.

8. The multilayer ceramic electronic component according to claim 1, wherein the dummy lead-through conductor has a rectangular or substantially rectangular shape.

* * * * *